March 10, 1953     H. C. N. McGEE     2,630,651
ANGLER'S BAIT CONTAINER
Filed Feb. 24, 1950
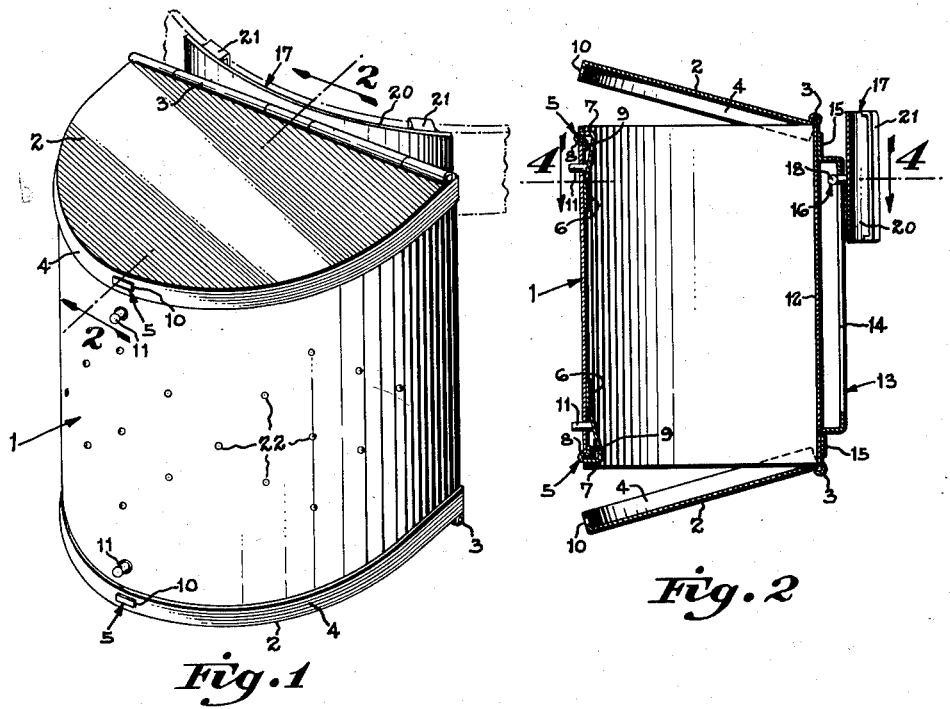
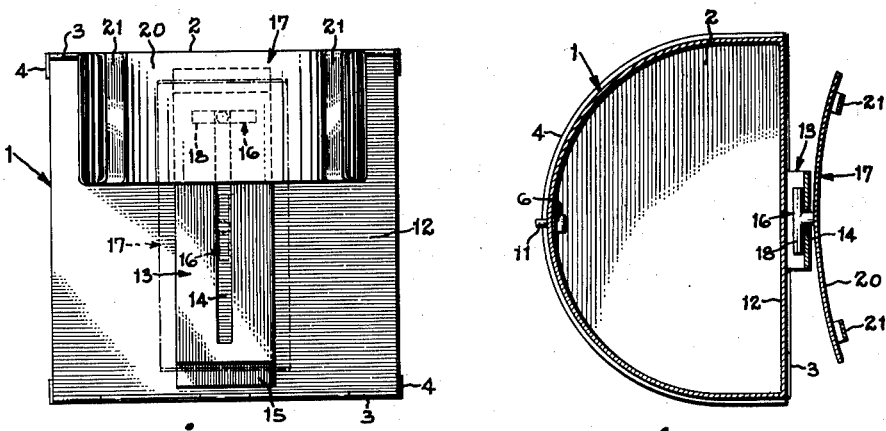
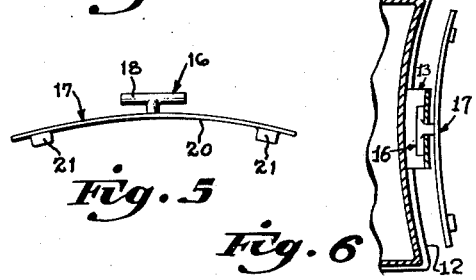
INVENTOR.
Hugh C. N. McGee
BY
Wood, Arey, Herron & Evans
ATTORNEYS.

Patented Mar. 10, 1953

2,630,651

UNITED STATES PATENT OFFICE 2,630,651

ANGLER'S BAIT CONTAINER

Hugh C. N. McGee, Dry Ridge, Ky.

Application February 24, 1950, Serial No. 145,985

6 Claims. (Cl. 43—55)

This invention relates to cans for holding fishing bait. The invention is directed particularly to an angler's bait container which is capable of preserving live bait in such a condition that the bait is more accessible to the angler when required than in containers which have been available in the past.

The containers of the present invention are adapted particularly for preserving fishing worms in a live, active state throughout a prolonged period. For this purpose it is necessary that a bed of moist moss, earth or loam be provided which will protect the worms from becoming overheated or deprived of moisture under the heat and sunlight which usually prevail during fishing seasons. However, when a number of worms are confined in a mossy layer or in a mass of soil, it is common knowledge that they migrate to the bottom of the container where the most favorable conditions of temperature and moisture are to be found. When the angler needs bait for replacement, it is necessary that he dig through the overlying layer of moss or soil in order to reach the bait which has migrated to the bottom of the container. This task is not only tedious and messy, but if the can contains various kinds of bait, as for instance red worms and night crawlers, the angler must make the selection largely by feel since he cannot see properly into the bottom of the can to take his choice. Moreover, considerable time is required to find a proper worm, especially if the supply is low, and the removal of the bait is very inconvenient if the angler is standing in a stream rather than sitting in a boat.

In recognition of these difficulties, the present invention contemplates a bait container which is of small size so that it may be worn conveniently by an angler for use in stream fishing, but which is also capable of effectively preserving the bait in a live and fresh condition despite its small size so that it may be used with equal success in boat fishing.

A further objective of the present invention has been to provide a bait container so constructed that the supply of bait which it contains may be visibly displayed to the angler with slight manipulation, to enable him to take his choice, without digging around through a layer of moss or soil and with the greatest ease, convenience and rapidity.

Further objectives of the invention and other advantages of the bait containers of the present invention are disclosed in the following detailed description of the drawings in which a preferred embodiment of the invention is disclosed.

In the drawings:

Figure 1 is a perspective view showing a bait container of the present invention in operative position, as being worn by an angler on his belt or other apparel.

Figure 2 is a cross-sectional view taken on the line 2—2 of Figure 1.

Figure 3 is an elevation looking at the rear of the container to illustrate constructional details thereon.

Figure 4 is a cross-sectional view taken on the line 4—4 of Figure 2, and

Figure 5 is a top plan view illustrating a hanger by which the container may be fastened to an angler's belt.

Figure 6 is a fragmentary cross sectional view showing a bait receptacle having a back wall of modified configuration.

Briefly, the invention is predicated upon the recognition of the propensity of bait such as worms to wiggle over a period of time to the bottom of a layer of moist moss or clay in which the bait has been deposited, and upon the concept of utilizing a container having removable closures at both of its ends so that the angler, by merely inverting the container prior to selection of a bait, may always cause the bait to be displayed in the most accessible condition at the portion of the container which then occupies the top position. In other words, the invention, in its simplest form, comprises a can having lids at both ends and adapted to receive a supply of insulating material such as moss or the like within which the bait may nest and be protected. Bait deposited in such a container through one of the lids, will, after a relatively short period of time, migrate to the bottom of the container and under ordinary circumstances it would be difficult for the angler to reach them. However, in the use of containers of the present invention, the angler who desires to select a bait first inverts the can to bring the bottom to the top position, then opens the lid at the then top side and finds the bait conveniently accessible before him. After selection, the lid is closed, and the worms soon migrate again to the bottom, but at the time of next selection, the can again is inverted to repeat the process.

In stream fishing the bait container is mounted on the angler's belt or wearing apparel in an accessible position. However, in this case the angler, holding a rod in one hand, must remove bait with the free hand. In this respect the invention contemplates a structure in which the bait container is pivotally associated with a mounting bracket, adapting it to be inverted in convenient manner by the angler with one hand after which the top lid may be opened for removal of a bait.

A structure embodying these advantages and improvements, as illustrated in the drawings, comprises a can indicated generally at 1 which may be fabricated of any suitable material such as sheet metal or plastic molding composition. The can 1 is equipped with lids 2, 2 at each end thereof, respectively. Preferably, the lids are hingedly mounted to the can as on the hinges 3. The lids are intended to fit the can relatively loosely, but sufficiently close to prevent the escape of bait, and for this purpose the lids 2 may be provided with marginal flanges 4 which reside adjacent the can wall.

The lids 2 are hinged to swing freely in respect to the can, but each lid is provided with a latch indicated generally at 5 to prevent the lid from opening inadvertently. Each latch comprises a leaf spring 6 having a portion mounted or riveted at the inside front wall portion of the can adjacent an end thereof. The leaf spring has a yieldable biasing portion extending inwardly of the can, and a laterally extending portion 7 projects therefrom out through an aperture in the front wall of the can. This portion 7 has a re-entrant ear 8 projecting back through the can aperture and terminating in a stop ear 9. The lid of the can is provided with a suitable seat or recess 10 which is adapted to be engaged by the latch when the lid is in the closed position. To open the lid, the leaf spring 6 is provided with an operating bottom or stud 11 which projects through the front wall of the can, so that the leaf spring may be pushed inwardly to withdraw the latch from engagement with the lid recess. By this construction the angler may place a finger of one hand on the bottom to depress it, and then lift and open the lid with other fingers of the same hand. In place of the latch construction just described, other suitable types of latches may be used but it is preferable that the latch be such that the angler may release it and open the lid with one hand only.

In the preferred structure the can 1 is of semicircular contour in cross-section to provide a back wall 12 which is relatively flat, or of slight arcuate configuration, to fit the contour of an angler's body or to reside inconspicuously against a wall portion of a boat. This construction provides a container of the greatest volume with the least outward projection.

The back wall 12 of the container carries a mounting strap 13 which is provided with an elongated slot 14 in its central portion. Strap 13 may extend substantially the length of the can and its foot portions 15, 15 may be fastened to the can by riveting or another suitable manner. In the alternative, the strap provided with the slot may constitute an integral part of the can. A hanger member 16 is received within the slot and this hanger may be mounted permanently or removably on a boat, or may be mounted upon a belt clip indicated generally at 17 which is adapted to be carried on the belt of an angler for stream fishing.

In the preferred construction the hanger 16 is T-shaped with the head of the T, 18, normally residing across the slot within the strap 13, while the leg portion of the T extends through the slot and beyond the strap 13 into connection with the boat or with the belt clip 17 as previously described. This construction causes the container to be suspended from the hanger in such a manner that its center of gravity, either loaded or unloaded, is well below, and outwardly from, the point of suspension at the hanger. Therefore, the lower portion of the container always tends to swing inwardly and bear upon the surface from which it is supported or upon the angler's body. This construction thus prevents the container from swinging freely about the hanger or moving about in dangling fashion to interfere with the movements of the angler.

When the container is to be inverted, it is merely rotated end for end in either direction about the leg of the hanger and is then released whereupon it gravitates to the position shown in Figure 2. However, when the container is to be demounted completely from the hanger, then it is rotated through only 90° so as to bring the head of the T into alignment with the slot 14 through which the head may then be passed.

The belt clip for supporting the hanger 16, or for adapting the container to be worn on the body of the angler may be of any suitable type. In the construction shown, the belt clip comprises a plate 20 preferably curved arcuately to fit the angler's body and provided with strips 21, 21 adjacent the ends of the plate and spaced therefrom to provide passages for receiving a belt.

It is preferable that the walls of the container be perforated as at 22 in order to provide for the passage of air into the container or to provide for the release of stagnant air, or to vent the can in case the lid is not opened for an appreciable period of time. Also, these passages allow moisture to evaporate from the moss or soil within the container, especially during hot, dry weather, and such evaporation helps to maintain a suitable cool temperature within the container. In addition, this construction permits the entire container to be immersed in a bucket of water and so to serve as a safe within which live minnows or similar bait may be confined when desired.

Having described my invention, I claim:

1. An angler's bait container comprising, a tubular body which is generally semicircular in cross-section, with a substantially flat wall extending across the curved wall portions, the said tubular body having open ends, lids respectively hinged to the body at the ends of the flat wall portion and adapted to close the open ends of the body, releasable latch means for holding the lids in closed positions over the open ends of the body, said flat wall comprising a portion having an elongated slot extending longitudinally of the body and terminating adjacent the open ends thereof, and a hanger having a pivot member rotatably and slidably engaging the said slot.

2. An angler's bait container comprising, a tubular body which is generally semicircular in cross-section, with a substantially flat wall extending across the curved wall portions, the said tubular body having open ends, lids respectively hinged to the body at the ends of the flat wall portion and adapted to close the open ends of the body, releasable latch means for holding the lids in closed positions over the open ends of the body, means on the container delineating an elongated slot extending longitudinally of the body at the flat wall portion of the body, with the ends of the slot terminating adjacent the ends of the body, and a hanger having a pivot member rotatably and slidably engaging the said slot.

3. An angler's bait container comprising a tubular body having open ends, releasable lids for respectively closing each open end of said tubular body, a hanger having a pivot member, and means for associating the container with the pivot member comprising an element attached to said tubular body and having an elongated slot therein extending substantially parallel with the longitudinal axis of the tubular body, the respective ends of the slot constituting successive points of suspension for said pivot member upon turning said tubular body end for end about the axis of said pivot member.

4. An angler's bait container comprising a tubular body having open ends, releasable lids for respectively closing each open end of said tubular body, means presenting a facial supporting surface, a hanger associated with said means, a member, provided with a slot affixed to the outside of said tubular body, the slot in said member extending substantially parallel with the longitudinal axis of said tubular member with the ends of said slot being respectively above and below the center of gravity of the container, said hanger having a pivot member rotatably and slidably engaged in said slot for suspending said tubular body from the hanger, said pivot member disposed upon an axis residing substantially at a right angle to said facial supporting surface and substantially at a right angle to the longitudinal axis of said tubular body.

5. An angler's bait container comprising a tubular body having open ends, lids respectively hinged to the body at the ends thereof and adapted to close the open ends of the body, releasable latch means for holding the lids in closed position over the open ends of the body, a member, provided with a slot affixed to the wall of the tubular body, the slot in said member extending substantially parallel with the longitudinal axis of said tubular member with the ends thereof spaced substantially equally from the respective ends of said tubular body, and a hanger having a pivot member rotatably and slidably engaged in said slot and disposed upon an axis extending substantially at right angles to the first mentioned axis.

6. An angler's bait container comprising a tubular body having open ends, releasable lids for respectively closing each open end of said tubular body, a member, provided with a slot affixed to the wall of the tubular body, the ends of the slot in said member being respectively above and below the center of gravity of the container, and a hanger for the tubular body having a pivot member rotatably and slidably engaged in said slot and disposed upon an axis extending substantially at a right angle to the longitudinal axis of said tubular body, whereby the container may be turned end for end about the axis of the pivot member and suspended from said pivot member successively at the respective ends of said slot with the center of gravity below said pivot member.

HUGH C. N. McGEE.

REFERENCES CITED

The following references are of record in the file of this patent:

UNITED STATES PATENTS

| Number | Name | Date |
| --- | --- | --- |
| 423,730 | Charlton | Mar. 18, 1890 |
| 475,977 | Dillingham | May 31, 1892 |
| 526,574 | Houghton | Sept. 25, 1894 |
| 692,089 | Swisher | Jan. 28, 1902 |
| 1,140,625 | Spitzler | May 25, 1915 |
| 1,318,850 | De Yong | Oct. 14, 1919 |
| 1,328,672 | Hirsohn | Jan. 20, 1920 |
| 1,610,344 | Williams | Dec. 14, 1926 |
| 2,436,109 | Kollman | Feb. 17, 1948 |
| 2,484,122 | Ross | Oct. 11, 1949 |